March 4, 1969     E. J. HENKEL     3,430,782
ARTICLE TRANSFER APPARATUS
Filed June 29, 1967
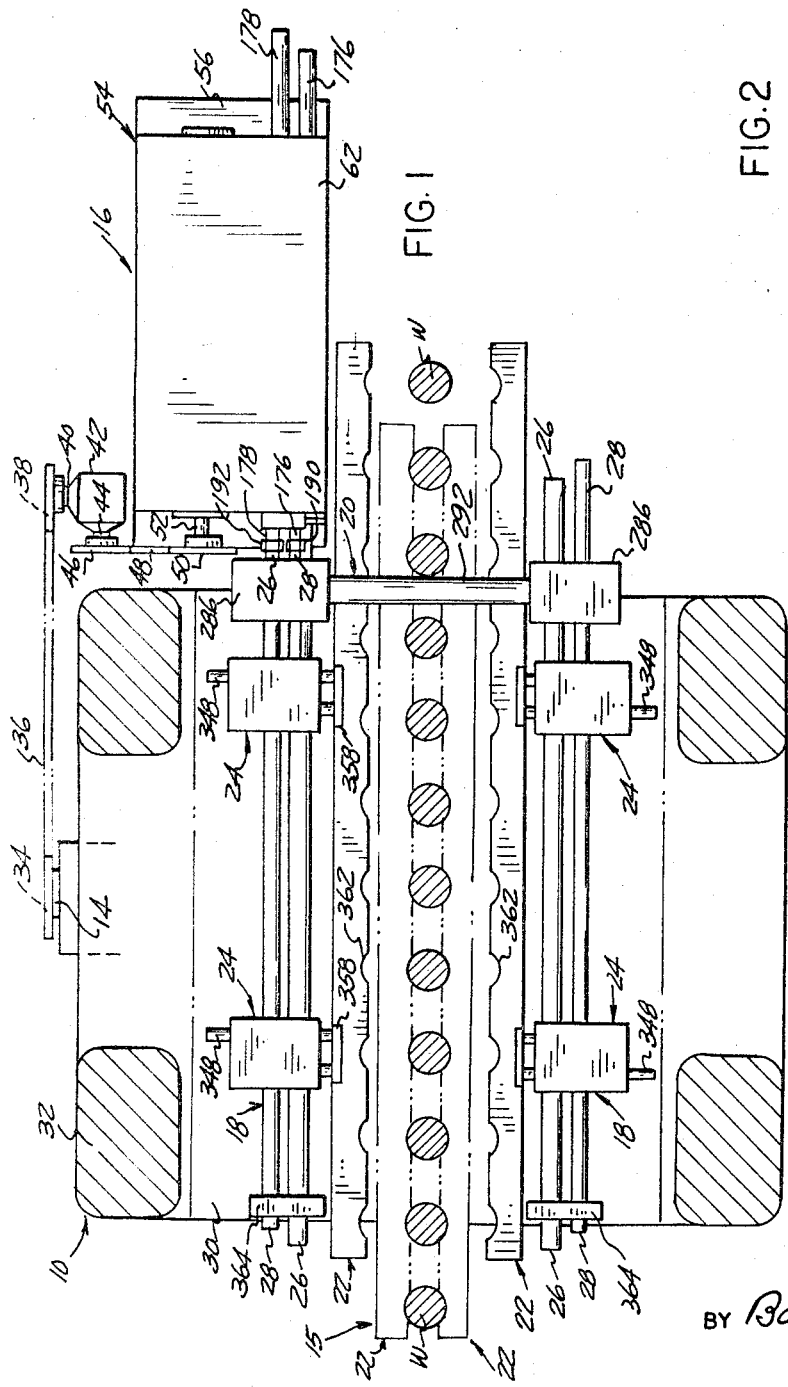
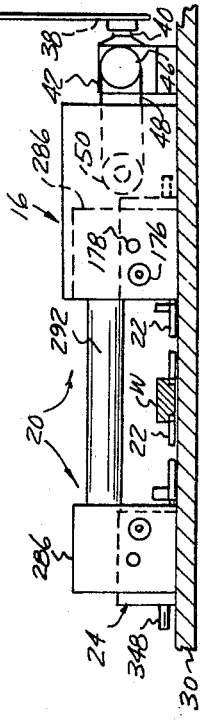
INVENTOR
EDWARD J. HENKEL
BY Barthel & Bugbee
ATTORNEYS March 4, 1969 E. J. HENKEL 3,430,782
ARTICLE TRANSFER APPARATUS
Filed June 29, 1967 Sheet 2 of 6

INVENTOR
EDWARD J. HENKEL
BY Barthel + Bugbee
ATTORNEYS

INVENTOR
EDWARD J. HENKEL
Barthel & Bugbee
ATTORNEYS

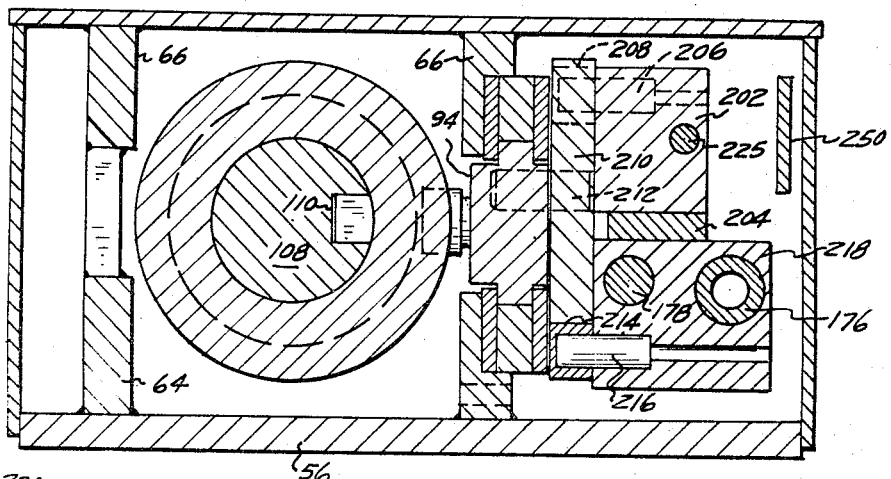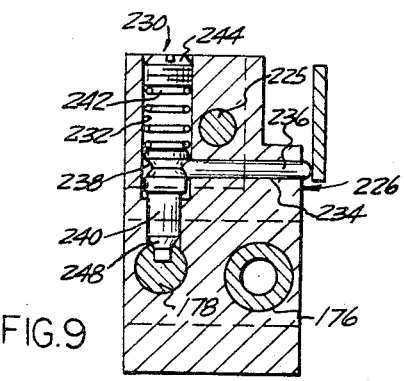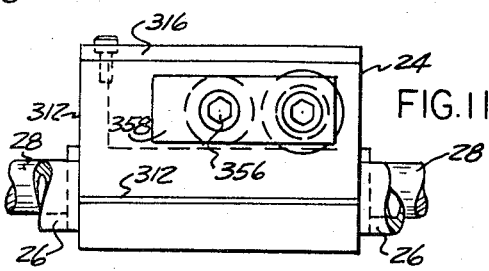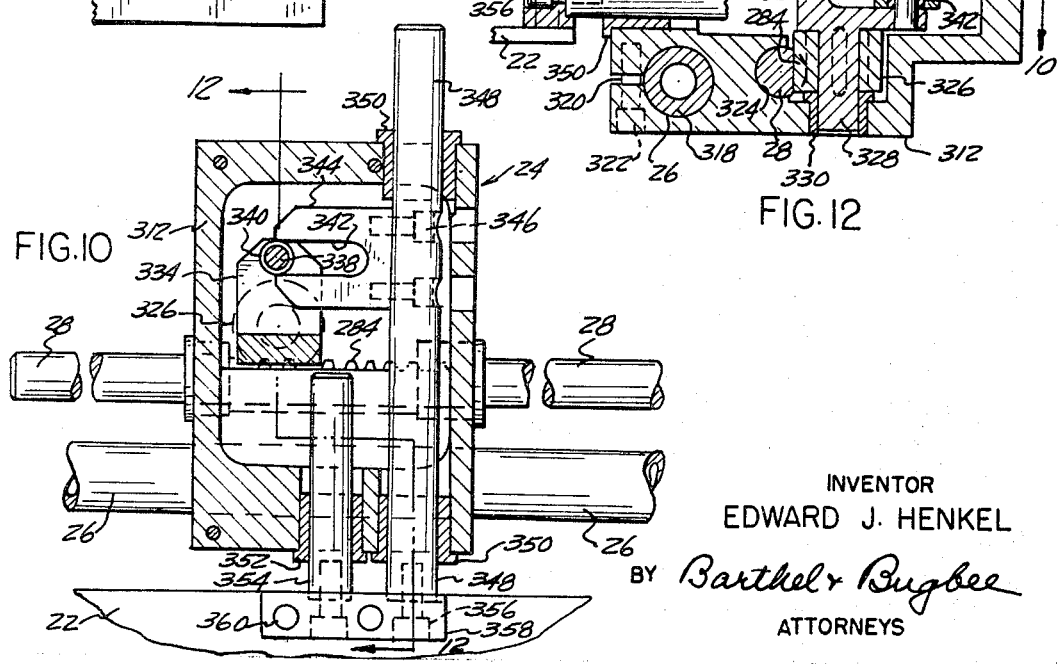

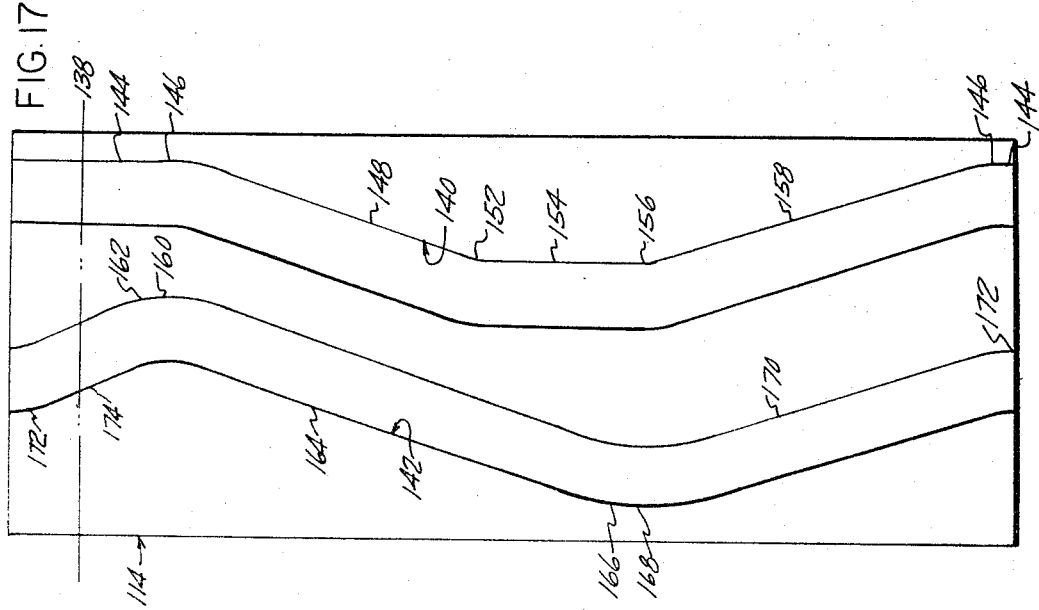
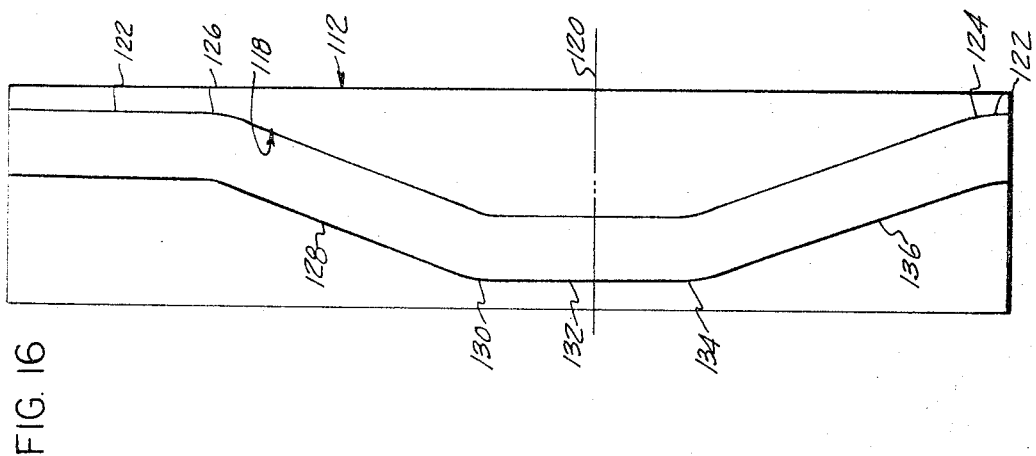

United States Patent Office 3,430,782
Patented Mar. 4, 1969

3,430,782
ARTICLE TRANSFER APPARATUS
Edward J. Henkel, 31625 Briarcliff Road,
Franklin, Mich. 48025
Filed June 29, 1967, Ser. No. 649,998
U.S. Cl. 214—1 20 Claims
Int. Cl. B25j 5/00; B65g 25/08

ABSTRACT OF THE DISCLOSURE

A transfer apparatus for articles such as workpieces or parts has a pair of oppositely-movable reciprocatory article-gripping transfer members which are caused to move in approximately rectangular paths to engage, move along and release such articles step-by-step through a plurality of stations, each time returning to a starting position in response to precision rotary cam-operated mechanism.

Brief summary of invention

The transfer members of this article transfer apparatus are actuated from a motion control unit containing rotary multiple track cams, the rotations of which are in turn synchronized with the operation of the machine, such as a stamping press, into and out of which the articles are to be moved, by being driven from a rotating part of the machine, such as the press crankshaft. This invention makes it possible to precisely control the travel of the articles as well as their acceleration and deceleration during their transfer. Furthermore, the present apparatus is provided with certain spring-pressed safety devices, the spring adjustments of which can be made from above when their cover plate is removed, thereby enabling the moving parts to run in an oil bath which does not need to be drained off before making such adjustments. These safety devices become instantly operative to halt the press and retract the article-gripping transfer members in the event of a malfunction of either the transfer apparatus or the press. These include yieldable detent units which, upon yielding, actuate a microswitch which in turn de-energizes the motor of the press.

In the drawings, FIGURE 1 is a top plan view of a precision article transfer apparatus, as installed in a mechanical press shown diagrammatically in cross-section, with the article-gripping transfer members shown in solid lines in their retracted starting positions and in dotted lines in their positions at the end of the transfer stroke;

FIGURE 2 is a right-hand side elevation of the article transfer apparatus of FIGURE 1, with the press omitted;

Figure 3:
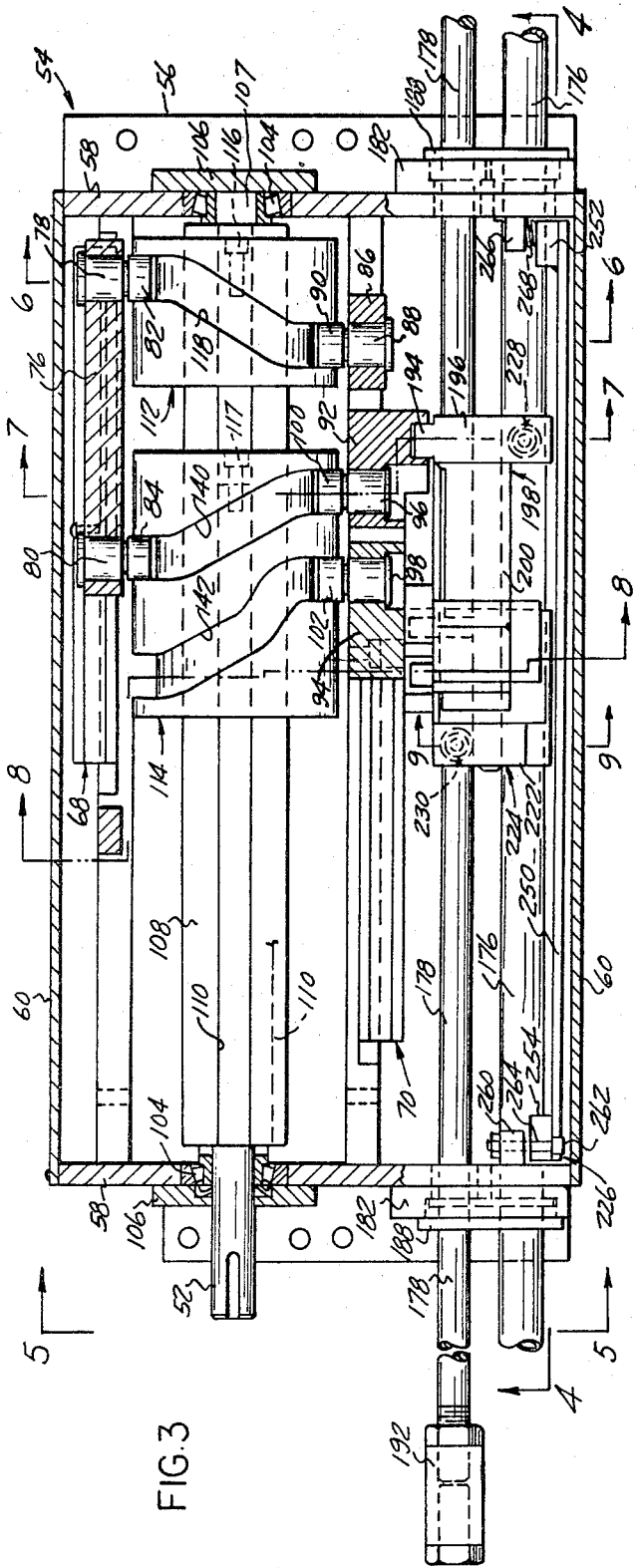
FIGURE 3 is an enlarged top plan view of the interior of the motion control unit, with the cover plate removed, and partly in horizontal section along the line 3—3 in FIGURES 4 and 5.

FIGURES 6, 7, 8 and 9 are cross-sections upon an enlarged scale along the lines 6—6, 7—7, 8—8 and 9—9 in FIGURE 3;

FIGURE 10 is a top plan view of one of the transfer member carriers upon an enlarged scale, with the cover plate removed so as to look in the direction of the line 10—10 of FIGURE 12, and with a portion of the transfer member attached to the carrier;

FIGURE 11 is a front elevation of the transfer member carrier shown in FIGURES 10 and 12;

FIGURE 12 is a vertical cross-section taken along the zigzag line 12—12 in FIGURE 10;

FIGURE 13 is a horizontal section upon an enlarged scale through the cross-over mechanism unit which operatively interconnects the two sets of transfer member carriers;

FIGURE 14 is a side elevation, partly in section, along the line 14—14 in FIGURE 13, of one end of the cross-over unit;

FIGURE 15 is a front elevation partly in cross-section along the line 15—15 in FIGURE 13, of the cross-over unit;

FIGURE 16 is a developed view of the cam track in the single track cam of the motion control unit shown in FIGURE 3; and FIGURE 17 is a similar view of the double track cam shown in FIGURE 3.

Referring to the drawings in detail, FIGURE 1 shows a machine, generally designated 10, such as a mechanical stamping press equipped with and served by an article transfer apparatus, generally designated 12, for transporting into and out of the press 10 a succession of articles W, such as identical workpieces operated on by the press 10. The press 10 is conventional and may be any one of a large variety of machines into which workpieces W are to be fed and out of which they are to be moved after being worked upon by dies or other work-processing equipment in the press 10, which is shown in section immediately above the die table across which the workpieces W are transported. The press or other machine 10 is assumed to be provided with a rotary shaft 14, such as a crankshaft of a mechanical press, from which rotating part the article transfer apparatus 12 is driven in timed relationship.

General arrangement

Considered generally, the article transfer apparatus 12 consists of a motion control unit 16 containing certain cams which drive an article transfer assembly 15 including two oppositely-movable article transfer units 18, the two units 18 being operatively interconnected by a cross-over motion-transmitting unit 20. Each transfer unit 18 in turn includes a notched article transfer member or work transfer bar 22 attached to a pair of transfer member carriers 24 which in turn are operatively interconnected and driven by two motion-transmitting rods 26 and 28 respectively, both of which have top rack teeth on their upper parts for actuating the unit 20. The inner motion-transmitting rods 26 are clamped bodily to their respective pair of carriers 24 for longitudinal movement thereof bodily to and fro, whereas the outer motion-transmitting rods 28 also have additional side rack teeth and are reciprocated independently of the inner motion-transmitting rods 26 to actuate gearing within their respective carriers 24 to move the article transfer members 22 transversely back and forth toward and away from one another, as described in more detail below and shown particularly in FIGURES 10, 11 and 12.

The machine 10, such as the stamping press shown in FIGURE 1, served by the article transfer apparatus 12 has the usual die table 30 and uprights or strain rods 32 between which the oppositely-movable article transfer units 18 operate while they rest upon the die table 30. The rotary shaft 14 of the machine 10 carries a sprocket 34 which conveys motion through a sprocket chain 36 to a sprocket 38 on the input shaft 40 of a gear box 42 with an output shaft 44 connected to the input shaft 40 through bevel gearing (not shown) within the gear box 42. The output shaft 44 carries a sprocket 46 which conveys rotary motion through a sprocket chain 48 to a sprocket 50 upon the input shaft 52 of the motion control unit 16. In this manner, as stated above, the motion control unit 16. In this manner, as stated above, the motion control unit 16 and therefore the article transfer apparatus 12 are operated precisely in synchronism with the press platen or ram (not shown) actuated by the crankshaft 14 of the press 10.

*Motion control unit*

Figure 4:
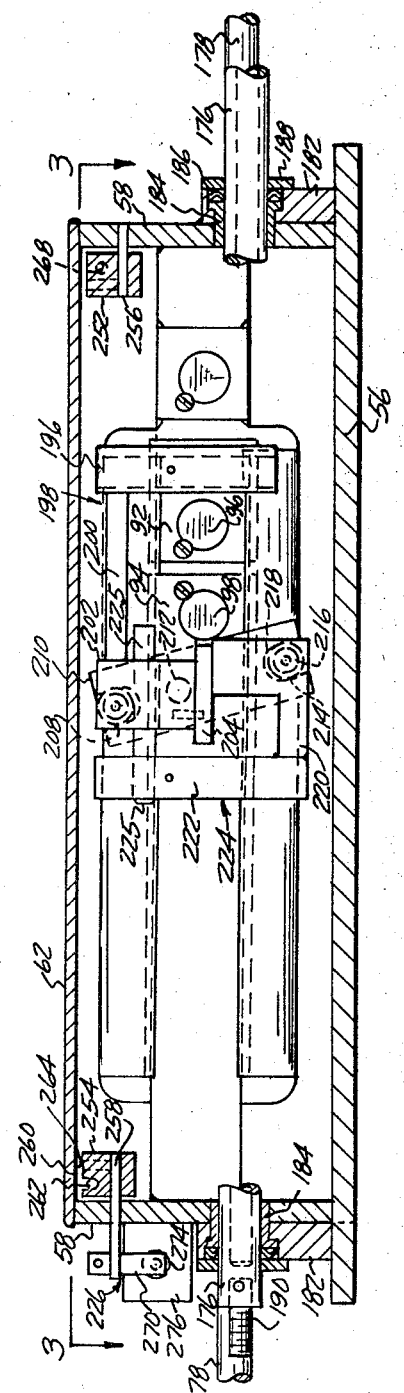
FIGURE 4 is a vertical section, partly broken away, taken along the line 4—4 in FIGURE 3.
Figure 5:
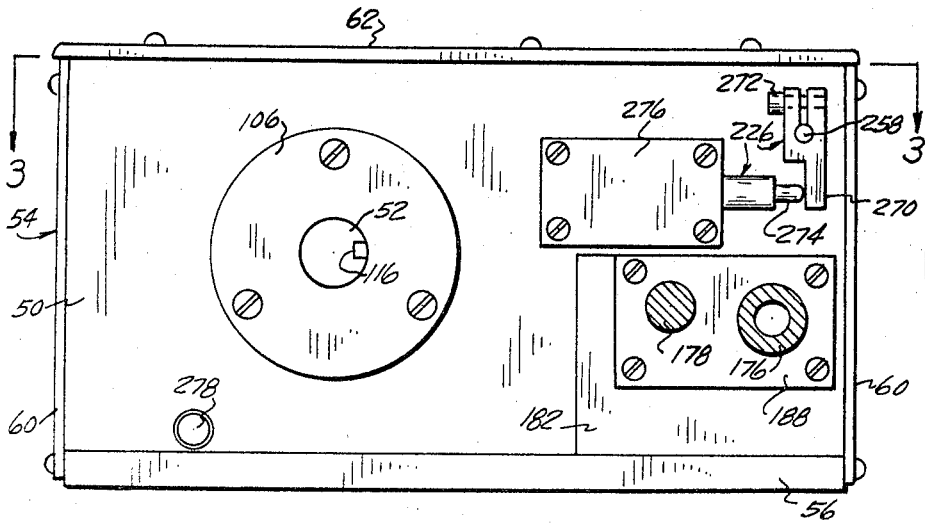
FIGURE 5 is a left-hand end elevation of the motion control unit of FIGURE 3, looking in the direction of the arrows 5—5 in FIGURE 3, and shown on an enlarged scale.
Figure 6:
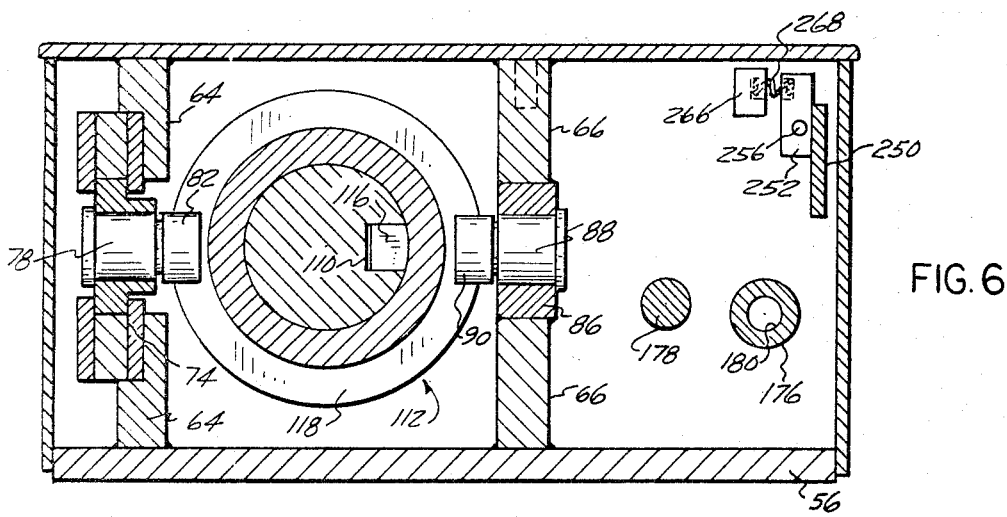
Figure 7:
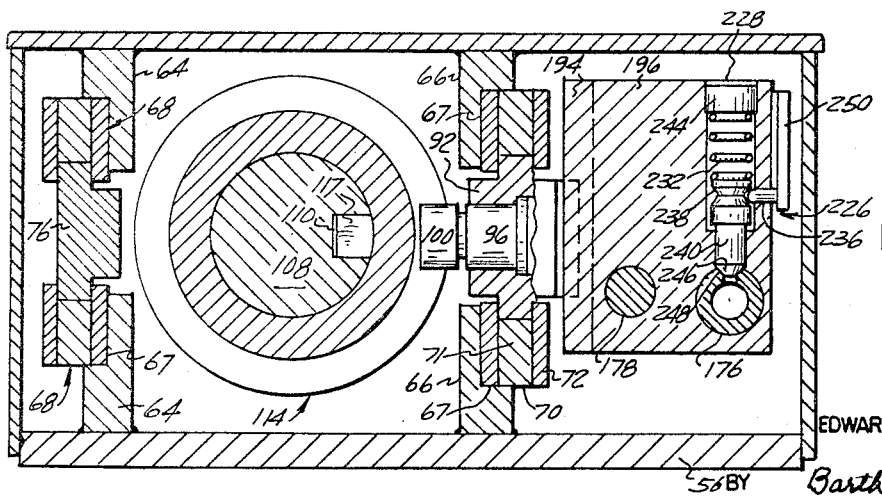

The motion control unit 16 (FIGURES 3 to 9 inclusive) is contained within a housing 54 including a base plate 56, opposite end walls 58, side walls 60 bolted thereto (FIGURE 3) and a top wall or cover plate 62 bolted or otherwise immovably secured to the upper edges of the end walls 58 (FIGURE 4). Extending between the end walls 58 in spaced parallel relationship to each other and to the side wall 60 (FIGURE 3) are two sets of vertically-spaced support bars 64 and 66 respectively (FIGURES 6, 7 and 9). The support bars 64 and 66 are rabbeted at 67 to receive outer and inner composite guide rails 68 and 70 respectively. Each guide rail 68 or 70 is composed of a central bar 71 and two side bars 72 of greater width secured thereto in such a manner as to provide guide channels 74. Slidably mounted in the rearmost or outermost composite guide rails 68 is an elongated third slide 76 (FIGURE 7) which is arranged to reciprocate horizontally therein longitudinally of the housing 54. The third slide 76 is bored horizontally and transversely near its opposite ends (FIGURE 3) to receive flanged stub shafts 78 and 80 rotatably supporting a pair of anti-friction cam follower rollers 82 and 84 respectively.

Welded or otherwise fixedly secured between the inner support bars 66 (FIGURE 6), is a stationary block 86 which is bored to receive a flanged stub shaft 88 also rotatably supporting an anti-friction cam follower roller 90. Slidably mounted in the inner guide rails 70 are longitudinally-spaced first and second slides 92 and 94 respectively, each being bored to receive the flanged stub shaft 96 or 98 of cam follower rollers 100 and 102 respectively. The first and second slides 92 and 94 are receiprocated independently of one another within their guide rails 70 in the manner described below.

The opposite end walls 58 are bored in alignment with one another to receive tapered roller bearing assemblies 104 which are covered by cover plates 106 and which rotatably support the reduced diameter input shaft portion 52 and the reduced diameter opposite end portion 107 of a cam shaft 108. The cam shaft 108 is provided with a longitudinal keyway 110 and drivingly and slidably supports a single-groove or single-track primary rotary cam or second cam 112 and a double-groove or double-track secondary rotary cam or first cam 114 (FIGURE 3) bolted to which are radial drive keys 116 and 117 respectively. The single groove cam or primary cam 112 is provided with a cam groove or cam track 118 engaged by the cam follower rollers 82 and 90 to propel the first slide block 76. The cam groove 118 extends around its entire periphery and at varying distances from its opposite ends to provide oscillatory motion of the third slide 76. The track or path of the cam groove 118 is seen in its developed form in FIGURE 16, i.e. as if the periphery of the cam 112 could be considered as stripped off and laid out on a flat surface, with the reference point the center line 120 of the keyway 116 which fits the keyway 110.

The single cam track 118 has a retracted dwell portion 122 extending from the point 124 to the point 126, a forwardly-inclined advancing portion 128 extending from the point 126 to the point 130, a forward dwell portion 132 extending from the point 130 to the point 134, and a rearwardly-inclined receding portion 136 extending from the point 134 to the point 124. The action of the single track cam 112 is described below in connection with the operation of the invention.

The double-track cam 114 has two cam tracks 140 and 142, shown in developed view in FIGURE 17 with respect to a similar reference point 138 which is the center line of its key 117. The cam track 140 is engaged by the cam follower rollers 84 and 100 to propel the first slide 92 and resembles the cam track 118 in having a retracted or rearward dwell portion 144 extending from the point 146 to the point 148, a forwardly-inclined advancing portion 150 extending from the point 148 to the point 152, a forward dwell portion 154 extending from the point 152 to the point 156, and a rearwardly-inclined receding portion 158 extending from the point 156 back to the point 146. The second cam track 142 of the rotary cam 114, however, differs principally from the first cam track 140 and the cam track 118 in providing substantially no dwell portion. In particular, the second cam track 142 has a rearwardly-located retracted point 160 at the midpoint of a rearward turn 162, a forwardly-inclined advancing portion 164 extending from the rearward turn 162 to a forward turn 166 having a midpoint 168 located at the farthest point of advance, and a rearwardly-inclined first receding portion 170 extending from the forward turn 166 to an intermediate turn 172 and thence by a second rearwardly-receding portion 174 of sharper inclination to the rearward turn 162. The second cam track 142 is engaged by the cam roller 102 to propel the second slide 94. From a comparison of FIGURES 16 and 17 it will be seen that the cam tracks 118 and 140 are of substantially the same configuration as regards the lengths of their respective dwell portions 132, 154 and 122, 144, and also as regards the angularity of their inclined portions 128, 148 and 136, 158, but differ in phase with respect to their angular circumferential distances from their respective keyway locations 120 and 138.

Motion is transmitted out of the motion control unit 16 by two horizontally-spaced parallel reciprocatory motion-transmitting shafts 176 and 178, the forward shaft 176 being a hollow or tubular shaft (FIGURES 3, 6 and 7) provided with a central bore 180. The forward and rearward motion-transmitting shafts 176 and 178 actuate the longitudinal and transverse motions respectively of the transfer member carriers 24 and consequently those of the transfer members 22, in the manner described below. The housing end walls 58 are bored and provided with correspondingly-bored reinforcement blocks 182 welded thereto for the reception of sleeve bearings 184, oil seals 186 and retaining plates 188 respectively (FIGURE 4). The outer or left-hand ends (FIGURES 3 and 4) of the shafts 176 and 178 are internally and externally threaded respectively for the reception of correspondingly-threaded coupling members 190 and 192 by which they are coupled to the motion-transmitting rods 26 and 28 respectively. Thus, in effect, the rods 26 and 28 are extensions of the shafts 176 and 178 respectively.

The first slide 92 is grooved vertically to receive and hold a vertical rib 194 on a vertical block 196 forming part of a bracket 198. The latter also includes a horizontal arm 200 which projects longitudinally leftward (FIGURES 3 and 4) and which at its left-hand end carries a vertical depending plate 202, to the bottom of which is bolted a horizontal bearing plate or wear plate 204. Near its upper end, the plate 202 is bored transversely to receive a roller pin 206 (FIGURE 8) the roller of which engages a notch 208 in the upper end of a rocking lever 210 drilled intermediate its ends to receive a pivot pin 212 (FIGURES 4 and 8) seated in the second slide 94 (FIGURE 8). At its lower end, the rocking lever 210 is provided with a notch 214 which receives the roller of a roller pin 216 seated in the transversely-bored lower portion of a vertical arm 218 extending upward from a horizontal arm 220 (FIGURE 4) secured at its opposite end to a vertical block 222, the arms 218, 220 and block 222 collectively constituting a bracket 224. The block 222 and plate 202 are bored longitudinally in alignment with one another to receive a longitudinal horizontal guide pin 225 seated in the block 222 and slidably engaging the plate 202. The upper end of the vertical arm 218 slidably engages the lower surface of the wear plate or guide plate 204.

The article transfer apparatus 12 is provided with a safety shut-off arrangement, generally designated 226. For this purpose, the plates 196 (FIGURE 7) and 222 (FIGURE 9) are provided with pressure-responsive safety release detent devices 228 and 230 respectively of identical construction releasably securing them to the reciprocable motion-transmitting shafts 176 and 178 respectively for the purpose of disconnecting the driving mechanism and halting the press 10 or other served machine in the event of a misfunctioning of the latter. Each such device 228 or 230 consists of a vertical bore 232 in the respective block 196 or 222 communicating with a transverse horizontal bore 234 containing a reciprocable round-ended pin 236. The inner end of each pin 236 normally engages an annular groove 238 of V-shaped cross-section in a spring-pressed detent plunger 240 urged downward by a compression coil spring 242 abutting a screw plug 244 threaded into the threaded upper end of the bore 232. The lower end of each plunger 240 is tapered as at 246 to fit into a correspondingly-tapered transverse hole or recess 248 in the upper side of the shaft 176 or 178.

Pivotally mounted adjacent the forward or outer end of the reciprocatory pins 236 of the detent devices 228 and 230 (FIGURES 7 and 8) is an elongated longitudinally-extending operating bar 250 secured at its opposite ends to the forward sides of two pivot blocks 252 and 254 (FIGURES 3 and 4) which in turn are bored in longitudinal alignment to receive pivot pins 256 and 258 respectively pivotally engaging the correspondingly-bored opposite ends 58 of the housing 54 and secured in their respective blocks by set screws. Secured as by welding to the left-hand housing end wall 58 is a stop block 260 (FIGURE 3) which is bored and threaded transversely for the reception of a stop screw 262 held in its adjusted position by a lock nut. The forward portion of the stop screw 262 adjacent its head engages a half-round transverse groove or notch 264 in the upper side of the pivot block 254 to limit its upward swinging.

Also secured as by welding to the right-hand housing end wall 58 is a spring abutment block 26 (FIGURES 3 and 6) which is recessed in its forward face to receive one end of a compression spring 268, the opposite end being seated in the correspondingly-recessed pivot block 252. The spring 268 constantly urges the operating bar 250 downward to rotate the pivot pins 256 and 258 in a clockwise direction (FIGURE 5). The pivot pin 258 is elongated to extend beyond the left-hand housing end wall 58 and on its outer end is clamped a switch-operating arm 270, the hub of which is split and bored and threaded to receive a clamping screw 272. The lower end of the arm 270 engages the operating button or plunger 274 of a normally-open safety control switch 276 (FIGURE 4) omitted from FIGURE 3. The housing 54 is liquid-tight and is normally filled with lubricating oil. The left-hand end wall 58 is drilled and threaded to receive a drain plug 278 (FIGURE 5).

*Article transfer assembly*

The two motion-transmitting rods 26 and 28 of each article transfer unit 18 of the article transfer assembly 15 constitute extensions of the reciprocatory motion-transmitting rods 176 and 178 of the motion control unit 16 by their interconnections through threaded couplings 190 and 192 (FIGURES 1 and 3). The two motion-transmitting rods 26 and 28 have top rack teeth 280 and 282 respectively for operating the gearing of the cross-over motion-transmitting unit 20, whereas the outer or second motion-transmitting rods 28 are additionally provided with side rack teeth 284 for operating the transverse motions of the work transfer bars or members 22, as will be described later.

The cross-over motion-transmitting unit 20 which operatively interconnects the work transfer members 22 for synchronized motion (FIGURES 1, 2 and 13 to 15) includes a pair of gear casings 286 mounted on the die table 30 and having facing inner side walls 288 (FIGURE 13) bored in alignment for the reception of sleeve bearings 290. The bearings 290 rotatably support a tubular outer cross shaft 292 within which is mounted a solid inner cross shaft 294 for independent rotation. The outer side walls 296 are also bored in alignment for the reception of sleeve bearings 298 which rotatably support the reduced diameter ends of the inner cross shaft 294. Keyed or otherwise drivingly secured to the opposite ends of the outer and inner cross shafts 292 and 294 are pinions 300 and 302 meshing respectively with the top rack teeth 280 and 282 on the motion-transmitting rods 26 and 28. The opposite end walls 304 of the gear casings 286 are bored for the reception of sleeve bearings 306 in which the motion-transmitting rods 26 and 28 are reciprocably mounted. The gear casing 286 are each additionally provided with a base plate 308 bolted to the die table 30 and a removable top closure plate 310 (FIGURES 14 and 15) bolted to the casing 286.

Each transfer member carrier 24 (FIGURES 10, 11 and 12) of which there are two pairs facing toward one another in opposite directions (FIGURE 1) includes a box-shaped casing 312 containing a cavity 314 closed by a top closure plate 316 bolted thereto and also near its forward lower edge containing a horizontal longitudinal bore 318 and a slot 320 communicating therewith (FIGURES 11 and 12). The casing 312 adjacent the slot 320 is drilled and, above the slot 320, threaded to receive clamping screws 322, of which only one is shown in FIGURE 12. The bore 318 snugly receives the motion-transmitting rod 26 and the casing 312 is clamped thereto by tightening the screws 322. As a result, the reciprocation of the rod 26 carries along with it the transfer member carrier 24 bodily without relative motion therebetween.

The casing 312 is also bored as at 324 parallel to the bore 318 to snugly but slidably receive the motion-transmitting rod 28, which it will be recalled at this location has rack teeth 284 along one side thereof. The rack teeth 284 mesh with and drivingly engage the teeth of a pinion 326 keyed to a stub shaft 328, the upper and lower ends of which are journaled in bearing bushings 330 and 332 (FIGURE 12) in the casing 312 and its cover plate 316 respectively. The stub shaft 328 above the pinion 326 is provided with an integral crank arm 334 which is slotted horizontally at 336 and drilled vertically in parallel spaced relationship to the axis of the stub shaft 328 to receive a headed pin 338 which rotatably supports a roller 340 in the slot 336. The roller 340 in turn rotatably engages the side walls of a slot 342 in a head plate 344 secured by screws 346 to a driven cross shaft 348. The opposite end of the casing 312 is bored in alignment for the reception of sleeve bearings 350 in which the cross shaft 348 is journaled (FIGURES 10 and 12) for sliding motion relatively thereto. The casing 312 is also bored at its forward end to receive an additional sleeve bearing 352 (FIGURE 10) in which an additional guide cross shaft 354 is slidably mounted in spaced parallel relationship to the driven cross shaft 348.

The outer ends of the cross shafts 348 and 354 are drilled and threaded axially for the reception of screws 356 (FIGURE 11) by which an elongated transfer member attachment block 358 is secured thereto. The attachment block 358 in turn is drilled upward and threaded from its lower side for the reception of screws 360 by which each work transfer member 22 is attached thereto. Each work transfer member 22 is attached to a pair of the attachment blocks 358 (FIGURE 1) and moved longitudinally and transversely by a pair of the transfer member carriers through the action of the motion-transmitting rods 26 and 28 respectively. Each transfer member 22 is in the form of an elongated bar or strip provided at intervals therealong with indentations or notches 362 facing toward the corresponding notches 362 in the opposite work transfer member 22 for gripping the workpieces or parts W to be transferred. It will be understood, of course, that the shape of the notches 362 will vary according to the workpiece shape. At their opposite ends (FIGURE 1) the motion-transmitting rods 26 and 28 are slidably mounted in a supporting structure consisting of the gear casings 286 and suitably-bored support blocks 364 bolted to the die table 30. Keyed to one end of the inner shaft 294 (FIGURE 13) is a pinion 370 meshing with a vertical rack bar 372 which is slidably mounted for vertical reciprocation in a vertically-bored bearing block 374. This retracts the article transfer members 22 upon malfunction of the mechanism during operation, as described below.

Operation

In connection with the invention, let it be assumed that an arrangement (not shown) has been made to deliver workpieces W in succession at spaced locations in a suitable delivery surface located in the right-hand end of FIGURE 1 and at spacings corresponding to the spacings of the notches 362 in the work transfer member 22. In the operation of the invention (FIGURE 1) the transfer members 22 will move from their retracted positions shown in solid lines toward one another into engagement with the spaced workpieces W, whereupon they will move to the left in a rectilinear path a predetermined distance at which they are properly located in the press or oven work processing machine 10 by which they are to be worked on. The work transfer members 22 then are moved away from one another into retracted forward positions to the left of the solid line positions shown in FIGURE 1, and finally are moved to the right back to their starting positions shown in solid lines in FIGURE 1, the notches 362 thus moving in approximately rectangular paths during each cycle of operation.

To accomplish this operation and these motions, is the function of the motion control unit 16, aided by the cross-over motion-transmitting unit 20 so that the two sets of article transfer units 18 move in synchronism with one another and with the rotation of the shaft 14 of the press or other machine 10 by which the work processing is accomplished.

This results from the rotation of the rotary press shaft 14 transmitting motion to the motion control input shaft 52 (FIGURE 1) by way of the sprockets 34 and 38 and sprocket chain 36, input and output shafts 40 and 44 of the gear box 42, and the sprockets 46 and 50 through the sprocket chain 48. The consequent rotation of the cam shaft 108 (FIGURE 3) rotates the primary and secondary cams 112 and 114. The rotation of the single track primary cam 112 by the action of the fixedly-mounted cam roller 90 in the stationary block 86 by engagement with the cam track or groove 118 causes the primary cam 112 to move back and forth along the cam shaft 108. As it does so, it causes the cam roller 82 and consequently the third slide 76 likewise to move back and forth between its guide rails 68, whereupon the cam roller 84 mounted on the third slide 76 also moves back and forth, transferring this motion to the first cam groove or track 140 of the secondary double-track cam 114. The motion, however, thus transferred to the secondary cam 114 is variable in accordance with the varying path of the first cam groove or track 140 so that a relative motion is imparted to the secondary cam 114 different from that of the third slide 76. Starting at the center line 120 of the keyway 110 from FIGURE 16 it will be seen that in the rotation of the primary cam 112, the cam roller 82 will be shifted from the dwell position 132 through the inclined portion 136 to the dwell position 132 and then returned through the oppositely-inclined portion 128 to the dwell portion 132.

While this is occurring, starting at the same keyway center line 138 in FIGURE 17, the cam roller 84 on the third slide 76 is caused to follow the dwell portion 144 to the turning point 146, consequently moving the cam roller 100 in the opposite portion of the cam groove 140 and with it the first slide 92 along the guide rails 70, carrying with it the bracket 198 and its cross pin 206. This action in the notch 208 of the rocking lever 210 around its pivot pin 212 (FIGURE 4) imparts longitudinal motion to the shaft 176 and rod 26 through its connection with the bracket 198 by means of the safety release detent device 228. The longitudinal motion of the shaft 176 in this manner causes the shaft 176 and rod 26 to move to the left and be retracted to the right in accordance with the inclined portions 148 and 158 and dwell portion 154 of the first cam groove 140 in the secondary double track cam 114.

Meanwhile, however, a different and variable motion is imparted by the different and variable path of the second cam groove 142 (FIGURE 17) to the cam roller 102 and consequently to the second slide 94 on which it is mounted. As a result, this same variable motion of the second slide 94 is transmitted to the pivot pin 212 mounted thereon and pivotally supporting the rocking lever 210. Thus, while the upper end of the rocking lever 210 is being moved by the roller pin 206 connected to the first slide 92 through the bracket 198, the pivot 212 thereof is also being moved by the second slide 94 through the action of the cam roller 102 in the cam groove or track 142. The result is a composite or differential motion imparted to the roller pin 216 and thence to the arm 218 of the bracket 224 which in turn imparts the same motion to the motion-transmitting shaft 178 and rod 28 through the safety detent device 230. Since the second cam groove 142 (FIGURE 17) of the secondary cam roller 114 has no dwell portions but only inclined advance and retraction portions 164 and 170 connected to one another by turns 160, 166 and 172, the motion imparted to the second slide 94 and consequently to the pivot pin 212 is a back-and-forth motion. The second or primary cam 112 serves the principal purpose of extending the lengths of stroke of the motion-transmitting shafts 176 and 178 by the multiplying effect of its cam groove 118 upon the third slide 76 on which is mounted the cam roller 84 which imparts longitudinal motion to the secondary cam 114.

The motions thus impressed upon the notion-transmitting shafts 176 and 178 from the motion control unit 16 (FIGURES 1 and 3) are transferred bodily to the motion-transmitting rods or shaft extensions 26 and 28 respectively through the couplings 190 and 192. In particular, the longitudinal motions of the hollow shaft 176 and rod 26 are transmitted bodily and unchangeably to the work transfer member carriers 24 clamped thereto by the screws 322 (FIGURE 12) and conveyed to the opposite carriers 24 through the outer tubular cross shaft 292 of the cross-over motion-transmitting unit 20 and the corresponding operating rod 26 at the opposite end of the hollow shaft 292.

Thus, during a cycle of operation, the transfer members are moved back and forth longitudinally by the action of the motion-transmitting rods 26 from the shaft 176 of the motion-control unit 16, and are also moved transversely toward and away from one another by the transverse motion imparted to them from the motion-transmitting shaft 178 and rods 28 by way of their cross shafts 348 (FIGURES 10 and 12) and attachment blocks 358. This transverse motion is produced by the longitudinal motion of the motion-transmitting shaft 178 coupled at 192 to the motion-transmitting rod 28 and thence through the inner shaft 294 of the cross-over motion-transmitting unit 20 to the opposite motion-transmitting rod 28. When the motion-transmitting shaft 178 and the motion-transmitting rod 28 coupled to it move longitudinally (FIGURES 1 and 10), the rack teeth 284 of the latter rotate the pinions 326, thereby swinging their crank arms 334, pins 338, and rollers 340 in arcuate paths within the slots 342 of the head plates 344 attached to the cross shafts 348 (FIGURE 10), thus imparting a reciprocatory transverse motion to the cross shafts 348 and work transfer members 22 attached thereto.

As a consequence of the construction of the safety-shut-off arrangement 226, if for any reason the motion-transmitting rods 26 or 28 and consequently the motion-transmitting shafts 176 or 178 are prevented from moving, as by a jamming or malfunction of the machine 10, the continued rotation of the cams 112 and 114 by the cam shaft 108 in the manner described above causes the blocks 196 and 222 of the brackets 198 and 224 to continue to move, thereby causing the tapered ends 246 of their respective detent plungers 240 (FIGURES 7 and 9) to move out of their recesses 248, shifting the plungers and their grooves 238 upward. This action pushes the round-ended pins 236 outward against the operating bar 250, swinging it in a counterclockwise direction (FIGURES 6, 7 and 9) against the contrary urge of the spring 268 and thus swinging the switch-operating arm 270 away from the switch-operating button 274. This action permits the normally-open switch 276 to open since it is no longer held closed by the arm 270 and pressure of the spring 268 on the operating bar 250. The opening of the switch 276, which is electrically connected in the motor control circuit (not shown) of the press or other served machine 10, opens and de-energizes the circuit and consequently halts the driving motor of the machine 10.

During normal operation, the oscillation of the inner shaft 294 (FIGURE 13) and its outer pinion 370 causes the rack bar 372 to move up and down in timed relationship with the press ram or palten so that no interaction occurs between them. Upon the occurrence of a malfunction where the transfer members 22 halt in their inner positions, the press ram in descending engages the upper end of the now-halted rack bar 372 and pushes it downward, consequently rotating the pinion 370 and the inner cross-shaft 294 to retract the transfer members 22 outward before the dies mounted on the press ram (not shown) and die table 30 can clash therewith. This prevents damage to any of these closely-related moving parts, because the rack bar 372 is in its raised position when the transfer members 22 are in their innermost positions and vice versa.

I claim:

1. A article transfer apparatus adapted to be driven from a rotating part of a machine served thereby for progressively moving articles through the served machine in timed relationship therewith, said apparatus comprising
    a housing,
    a cam shaft rotatably mounted in said housing and adapted to be drivingly connected to the rotating part of the served machine for rotation in timed relationship therewith,
    rotary cam means slidably and drivingly connected to said cam shaft and having first and second endless cam tracks extending circumferentially therearound and axially therealong,
    first and second slides reciprocably mounted in said housing and having first and second cam followers engaging said first and second cam tracks respectively,
    a supporting structure adapted to be mounted in proximity to the served machine,
    first and second motion-transmitting members mounted in said housing for independent reciprocation relatively thereto and extending externally of said housing and reciprocably mounted in said supporting structure,
    a first article transfer carrier means connected to said first motion-transmitting member for unitary travel therewith longitudinally of said supporting structure,
    first article transfer means mounted on said carrier means for unitary travel longitudinally therewith and for relative travel transversely thereto and having article-gripping elements thereon,
    and mechanism operatively connected said first and second slides to said first and second motion-transmitting members and for operatively connecting said first and second motion-transmitting members to said carrier means and to said transfer means respectively for successively imparting forward longitudinal travel to said carrier means and transfer means, transverse outward travel to said transfer means, longitudinal return travel to said carrier means and transfer means, and transverse inward travel to said transfer means whereby said transfer means moves in an approximately rectangular path of travel relatively to the served machine.

2. An article transfer apparatus, according to claim 1, wherein said cam means includes a double-track secondary rotary cam slidably and drivingly connected to said cam shaft and containing said first and second cam tracks.

3. An article transfer apparatus, according to claim 2, wherein said cam means also includes a primary rotary cam also slidably and drivingly connected to said cam shaft for sliding motion independently of said secondary cam and having a third endless cam track also extending circumferentially and axially thereon, a stationary cam follower fixedly secured to said housing and engaging said third cam track, a third slide reciprocably mounted in said housing and carrying a third cam follower also engaging said third cam track and also carrying a fourth cam follower engaging said first cam track on said secondary cam whereby rotation of said primary cam imparts longitudinal travel to said third slide which in turn imparts still greater longitudinal travel to said secondary cam along said cam shaft.

4. An article transfer apparatus, according to claim 3, wherein said first and second slides are slidably mounted for travel along a first guideway and wherein said third slide is slidably mounted for travel along a second guideway disposed in spaced parallel relationship to said first guideway.

5. An article transfer apparatus, according to claim 3, wherein said third endless cam track of said primary cam has substantially the same configuration as said first endless cam track of said secondary cam.

6. An article transfer apparatus, according to claim 5, wherein corresponding points on said third endless cam track and first endless cam track differ in phase circumferentially.

7. An article transfer apparatus, according to claim 1, wherein said second slide carries a pivot member with a rocking lever pivoted thereon, wherein said first slide carries a first contact element secured to said first motion-transmitting member and pivotally engaging said rocking lever at a first location spaced away from said pivot member, and wherein a second contact element is secured to said second motion-transmitting member and pivotally engages said rocking lever at a second location spaced away both from said pivot member and from said first contact element.

8. An article transfer apparatus, according to claim 7, wherein said first and second contact elements are disposed on opposite sides of said pivot member.

9. An article transfer apparatus, according to claim 7, wherein at least one of said contact elements has a releasable coupling releasably securing it to its respective motion-transmitting member.

10. An article transfer apparatus, according to claim 7, wherein both of said contact elements have releasable couplings releasably securing them to their respective motion-transmitting members.

11. An article transfer apparatus, according to claim 9, wherein there is provided a safety machine shut-off switch adapted to be electrically interposed in the driving motor control circuit of the machine, and wherein said releasable coupling contains mechanism responsive to a halting of said respective motion-transmitting member for actuating said switch whereby to halt said machine driving motor and said machine.

12. An article transfer apparatus, according to claim 11, wherein said responsive mechanism includes a detent device releasably engaging said respective motion-transmitting member and movable relatively thereto upon halting thereof into switch-actuating position.

13. An article transfer apparatus, according to claim 12, wherein a swinging instrumentality is movably mounted in said housing between said detent and said switch and is movable by said detent device into and out of operative engagement with said switch.

14. An article transfer apparatus, according to claim 1, wherein said article transfer member carrier includes a hollow casing fixedly secured to said first motion-transmitting member, and wherein said first-mentioned mechanism includes a transversely-movable element mounted in said casing for travel substantially perpendicular to the travel of said first motion-transmitting member, and a motion-converting device operatively interconnecting said second motion-transmitting member and said transversely-movable element and responsive to reciprocatory motion of said second motion-transmitting member relatively to said first motion-transmitting member for moving said transversely-movable element in said substantially perpendicular travel.

15. An article transfer apparatus, according to claim 14, wherein said motion-converting device includes rack-and-pinion gearing interposed between said second motion-transmitting member and said transversely-movable element.

16. An article transfer apparatus, according to claim 1, wherein additional third and fourth motion-transmitting members are mounted in said supporting structure in spaced parallel relationship to said first and second motion-transmitting members, wherein second article transfer member carrier means are connected to said third motion-transmitting member for unitary travel therewith longitudinally of said supporting structure, wherein second article transfer means are mounted on said second carrier means for unitary travel longitudinally therewith and for relative travel transversely thereto and having second article-gripping elements thereon disposed opposite said previously-mentioned article-gripping elements, and wherein cross-motion-transmitting mechanism is interposed betweeen said first and second motion-transmitting members and said third and fourth motion-transmitting members effective to move said first and second carrier means simultaneously in the same longitudinal direction at the same speeds and also effective to move said first and second article-transfer means transversely toward and away from one another in opposite directions into and out of article gripping engagement.

17. An article transfer apparatus, according to claim 16, wherein said motion-transmitting members have rack teeth thereon and wherein said cross-motion-tarnsmitting mechanism includes a pair of rotary shafts each carrying pinions meshing with the rack teeth on corresponding motion-transmitting members for imparting corresponding motions thereto.

18. An article transfer apparatus, according to claim 16, wherein said motion-transmitting members have rack teeth thereon and wherein said cross-motion-transmitting mechanism includes a pair of rotary shafts each carrying pinions meshing with the rack teeth on corresponding motion-transmitting members for imparting corresponding motions thereto.

19. An article transfer apparatus, according to claim 17, wherein one of said rotary shafts imparts transverse motion to said second article-transfer means for advancing and retracting the same, and wherein a reciprocatory auxiliary retraction device is operatively connected to said one rotary shaft and projects into the path of a reciprocable part of the served machine for normal reciprocation in synchronism therewith, said auxiliary retraction device being responsive to a departure from synchronous reciprocation with the served machine part for forcible reciprocatory engagement therewith and thereby forcibly rotating said one rotary shaft and consequently forcibly retracting said first and second article transfer means.

20. An article transfer apparatus, according to claim 19, wherein said auxiliary retraction device includes an additional pinion drivingly connected to said one rotary shaft and a toothed rack member meshing with said additional pinion and mounted for reciprocation codirectionally with said reciprocable part of the served machine and projecting into the path of travel thereof for interception thereby in response to said departure from synchronous reciprocation therewith.

References Cited

UNITED STATES PATENTS 3,135,395  6/1964  Wallis _____ 198—218 X

FOREIGN PATENTS 599,841  6/1960  Canada.

GERALD M. FORLENZA, *Primary Examiner.*

G. F. ABRAHAM, *Assistant Examiner.*

U.S. Cl. X.R.

198—218